United States Patent [19]

Pollard

[11] 4,010,655
[45] Mar. 8, 1977

[54] DRIVE BELTING AND DRIVE BELTS MANUFACTURED THEREFROM

[76] Inventor: Ernest Pollard, Bank House, Harden, Bingley, Yorkshire, England

[22] Filed: Jan. 19, 1976

[21] Appl. No.: 649,947

[52] U.S. Cl. .............................. 74/231 P; 74/231 J; 74/234; 74/238
[51] Int. Cl.² .................. F16G 1/00; F16G 5/00; F16G 9/00
[58] Field of Search .............. 74/231 P, 231 J, 233, 74/234, 238

[56] References Cited

UNITED STATES PATENTS

| | | | |
|---|---|---|---|
| 1,442,268 | 1/1923 | Gusdorf | 74/231 J |
| 1,679,575 | 8/1928 | Kimball | 74/231 J |
| 2,805,182 | 9/1957 | Hallenbeck | 74/231 P X |
| 3,563,103 | 2/1971 | Sauer | 74/233 |
| 3,693,218 | 9/1972 | Jaubert et al. | 74/231 J |
| 3,930,417 | 1/1976 | Ballou | 74/231 P |

FOREIGN PATENTS OR APPLICATIONS 907,157   10/1962   United Kingdom .............. 74/231 P

*Primary Examiner*—Leonard H. Gerin
*Attorney, Agent, or Firm*—John C. Smith, Jr.

[57] ABSTRACT

An improved drive belting comprises a woven tape constraining element embedded in a polyurethane body element. The warp threads of the woven tape constraining element have a higher modulus of elasticity than the polyurethane body element, are resistant to heat shrinkage and extend substantially through the length of the polyurethane body element to resist extension of the polyurethane body element. At least the warp threads of the woven tape are preferably composed of rayon, although the weft threads may be nylon. The polyurethane has good frictional properties and is extremely wear resistant making it particularly suitable for driving belts.

7 Claims, 6 Drawing Figures

U.S. Patent     Mar. 8, 1977     4,010,655
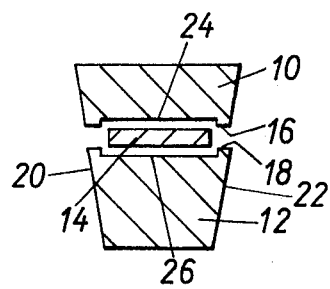
-FIG. 1-
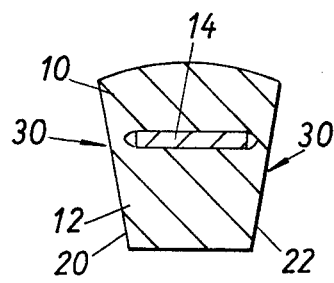
-FIG. 3-
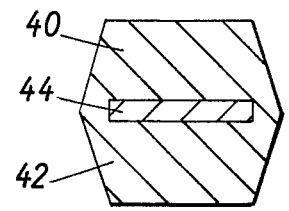
-FIG. 4-
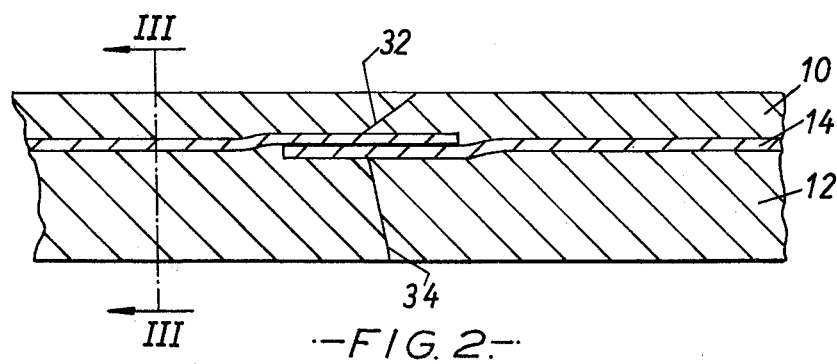
-FIG. 2-
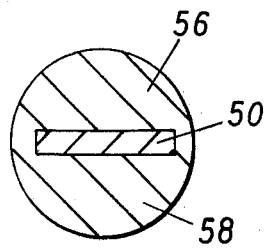
-FIG. 5-
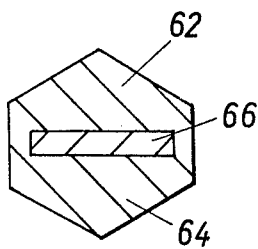
-FIG. 6-

DRIVE BELTING AND DRIVE BELTS MANUFACTURED THEREFROM

BACKGROUND OF THE INVENTION

The invention relates to drive belting made principally from plastics material, and to drive belts made from such belting.

DESCRIPTION OF THE PRIOR ART

It is known to provide drive belting having a body member and one or more reinforcing elements but the known belting suffers from various disadvantages.

For example British Patent Specification No. 750,668 (Laver) discloses a belt of indiarubber or like material reinforced with flexible metal strip. However the indiarubber or like material has poor friction and wear properties and indeed Laver indicates that it is necessary to cover the indiarubber with rubber impregnated canvas. Furthermore the indiarubber tends to break away from the metal. A disadvantage of metal reinforcement is that it tends to make the belting totally inextensible. However it is preferable for drive belting to be capable of a very slight degree of elastic deformation so that when stretched around a pulley the belting grips the pulley tightly.

United States Pat. No. 3,402,616 (Prior) discloses a belt of complicated construction but of inferior performance. The reinforcing materials disclosed in the specification are unsatisfactory, and they include metal, which is too inextensible, and nylon cords, which, on the contrary, are too elastic. Belting which is capable of a great deal of extension is as unsatisfactory as belting which is capable of no extension at all, since the belting is liable to slip. Yet another disadvantage of the belting disclosed in U.S. Pat. No. 3,402,616 is that it is difficult to obtain a satisfactory bond between the body of the belt and the load carrying materials which are described.

SUMMARY OF THE INVENTION

It is the main object of the invention to provide drive belting having characteristics which are significantly better than those of known drive belting. In particular it is an object of the invention to provide drive belting which is of very simple, and hence inexpensive construction, but which nevertheless has excellent gripping properties and is resistant to wear.

I have chosen polyurethane as the material for the driving surfaces of the belting as I have found that this material has good frictional properties, making it particularly suitable to transmit drive, and it is very resistant to wear. The material is also particularly easy to form into the desired configuration and it may, for example, be extruded. However I have found that it is a serious drawback of polyuethane that it is very elastic, and it is therefore important to provide suitable reinforcing means, but conventional belt reinforcing means such as steel or plastics strips or cords or wires, I have found to be unsatisfactory. It is difficult to successfully bond the polyurethane and reinforcing means together, and the stretch characteristics of known reinforcement means are also unsatisfactory. In order to get polyurethane to adhere to conventional reinforcement means it is necessary to use bonding techniques of such strength that no relative movement between the layers of the belting is possible. Consequently when the belting is flexed in use the bonds tend to break down and the polyurethane peels away from the reinforcement, destroying the belting and possibly damaging the equipment which the belting is driving. Furthermore I have found that steel or plastics strips or wires tend to be too inextensible, while cords or other elongate fibres tend to be too elastic.

My initial choice of reinforcing element was a woven nylon tape. The woven nature of the tape made it particularly suitable for bonding to polyurethane, since the plastics material could penetrate the interstices of the tape to key it to the tape. Furthermore, the keys thus formed were slightly elastic, so that the belting was able to flex without the keys breaking and causing the polyurethane to peel off. However I appreciated that it would not be sufficient to use untreated nylon tape, at this proved too elastic. I decided that it would be necessary to pre-stretch the nylon before bonding it to the polyurethane, in order to increase the modulus of elasticity of the nylon tape and hence decrease its tendency to stretch under load. However when I endeavoured to extrude polyurethane around a pre-stretched nylon tape reinforcement, I discovered that the nylon shrinks because of the temperature at which the extrusion is carried out. When the finished belt returns to normal temperature however, the nylon returns to its original length, and the advantage of pre-stretching to nylon is therefore lost and a reinforcement results which is still too elastic.

I have now selected as a reinforcing element a woven tape in which the warp fibres are resistant to shrinkage at elevated temperatures.

Accordingly the present invention provides drive belting comprising at least one elongate polyurethane body element and at least one elongate constraining element of woven tape, the warp threads of said woven tape contraining element having a higher modulus of elasticity than the body element, being resistant to heat shrinkage, and extending substantially throughout the length of the body element but totally enveloped in the body element to resist extension of the body element.

A particularly suitable material for forming the warp fibres has been found to be rayon, although the weft fibres may be of nylon.

It is preferred that the drive belting is manufactured by extruding the polyurethane around the woven tape constraining element. In an alternative however, the body element may comprise two parts at least one of which is grooved to receive the constraining element in a face which mates with a corresponding face of the other body element part, the two body element parts being fused together around the constraining element to form an integral body element with the constraining element therein.

The invention includes an endless drive belt made from drive belting as described aforesaid, when the ends of said body element are joined in substantial abutment, for example by being fused together.

It is preferred that where the ends of each part of the body element are joined together, the jointed ends of each part are inclined to a perpendicular to the inner and outer faces of the belt, and the inclination of the joint of one part is different to that of the other part.

BRIEF DESCRIPTION OF THE DRAWINGS

Further objects and advantages of the invention will become apparent from the following description, made with reference to the accompanying drawings, in which;

FIG. 1 is a transverse cross-section through elements used to form one embodiment of V-belt according to the invention;

FIG. 2 is a longitudinal cross-section through the joint of a second embodiment of V-belt according to the invention;

FIG. 3 is a transverse cross-section on the line III—III in FIG. 2, and

FIGS. 4 to 6 show transverse cross-sections through other embodiments of belting according to the invention.

Referring first to FIG. 1, there are shown an outer body element part 10, an inner body element part 12, and a constraining or reinforcing element 14, the two body element parts having a cross-section such that when placed together (i.e., with their faces 16 and 18 in face-to-face abutment) they form a trapezoidal V-belt shape, with converging side faces 20 and 22, which are intended to engage with the converging side faces of a V-groove in a pulley. The body element parts 10 and 12 are formed with complimentary recesses 24 and 26 in the mating faces 16 and 18, so that when the two body elements are brought together, they define an enclosed passage formed by the recesses 24 and 26, this passage extending throughout the length of the belting. The constraining element 14 is of woven tape having a generally rectangular cross-section and it fits closely into the passage formed by the recesses 24 and 26.

It will be understood that the belting is made in long lengths, so that when it is required to make a particular V-belt, the appropriate shorter length can be cut off and its ends joined together, as will be further described, to produce an endless belt.

The body element parts are both made of polyurethane but the constraining element 14 is made of woven tape having rayon warp threads and nylon weft threads. The tape may be pre-stretched in its longitudinal direction to increase the modulus of elasticity of the rayon warp threads.

To manufacture the belting the three elements 10, 12 and 14 are brought together and the two polyurethane elements are fused together by heat treatment along their edges. After the heat treatment the polyurethane completely encloses the constraining element 14 and the polyurethane has flowed into the interstices in the woven tape, thereby keying the polyurethane and tape together.

Although in the embodiment shown in FIG. 1, the body element is formed in two separate parts which are thereafter joined together around the constraining element 14, a preferred way of making belting having a similar final cross-section to that shown in FIG. 1, is to extrude polyurethane through an appropriately shaped die, the woven tape constraining element 14 being fed through the die during the extrusion process, so that the polyurethane is extruded in a plastics state around the tape. This is a similar manufacturing process and it improves the extent to which the polyurethane penetrates into the tape, and this in turn improves the degree of bonding between the body element and the constraining element. FIG. 3 is a cross-section through belting formed by an extrusion process. The temperature at which the polyurethane is extruded is in the range 170° to 190° Centigrade.

In order to form an endless belt from belting such as that illustrated in FIG. 1 or FIG. 3, an appropriate length of the belting is cut off, and is then joined end-to-end to form the endless belt. As illustrated in FIG. 2, the upper and lower parts 10 and 12 of the polyurethane body element are cut with inclined faces 32 and 34 respectively, the inclination of these end faces being in opposite directions. The woven tape constraining element 14 is left projecting beyond each end of the body element, by about 7.5 millimeters, and longitudinally extending slits are provided in the ends of the belting between the body elements and the constraining element. The ends of the belting are then placed together, the overhanging portions of the woven tape 14 being forced into the respective other end of the belting, so that an overlap of about 15 millimeters length of the constraining element is created. Before the ends of the constraining element are pressed together, the projecting end portions are coated with a bonding solution such as a cement.

Once the ends of the belting have been pushed together, as illustrated in FIG. 2, the joint portion of the belt is placed in a die channel having the same cross-sectional shape as the belt, and a top plate is secured on the die channel, the joint being then enclosed around all its sides. Heat is then applied to the lower channel die member, and this heat is conducted to the top plate, so that the outside surfaces of the belt (i.e., the outside surfaces of the polyurethane body element) become molten around the joint. During this operation, compressive force is applied to the belt joint in the direction along the longitudinal axis of the belt, this force serving to cause the inter-face between the polyurethane ends to fuse together at a slightly lower temperature than would be the case under non-pressurized conditions. Since the belt joint cannot expand in width or thickness owing to the fact that it is enclosed within a die, the joint becomes a homogeneous mass, which is moulded to the contours of the belt, and the molten polyurethane penetrates into both ends of the woven tape constraining element.

The woven tape constraining element 14 is positioned in the belting, along the pitch line of the belting. The constraining element is therefore subject to very little tension or compression when the belting is passing around a wheel or pulley. The inner part 12 of the body element is under compression when the belting is passing around a pulley, but this part is highly elastic and is intended to perform the function of gripping the pulley. The outer part 10 of the body element tends to stretch when the belt is passing around a pulley, because this portion of the belt is under tension. However the extension of the outer element 10 is restricted by the constraining element 14 and the constraining element transmits practically all the tensile load. Since the constraining element is almost inextensible, the belt remains tightly around the pulley, in spite of the elasticity of the polyurethane body.

FIG. 4 illustrates a different form of belting for use in the manufacture of double V-belts, and this form can either be produced by using two body element parts 40 and 42 with a tape constraining element 44 sandwiched therebetween, or the belting can be formed by extrusion.

FIG. 5 shows circular belting, which again can be manufactured by either of the two methods, and FIG. 6 illustrates belting of hexagonal cross-section.

The invention is not restricted to the details of the foregoing embodiments and while the woven tape constraining element specifically described has warp threads of rayon and weft threads of nylon, it will be appreciated that the warp threads may be of any other material having a similar modulus of elasticity to rayon, and the weft threads may be of any other flexible material.

I claim:

1. Drive belting comprising at least one elongate polyurethane body element and at least one elongate constraining element of woven tape, the warp threads of said woven tape constraining element having a higher modulus of elasticity than the body element, being resistant to heat shrinkage, and extending throughout the length of the body element but totally enveloped in the body element to resist extension of the body element.

2. Drive belting as claimed in claim 1, in which the warp fibres are of rayon.

3. Drive belting as claimed in claim 1, in which the weft fibres of said woven tape constraining element are of nylon.

4. Drive belting as claimed in claim 1, in which the polyurethane is extruded around said constraining element.

5. Drive belting as claimed in claim 1, in which the body element comprises two parts, at least one of which is grooved to receive the constraining element in a face which mates with a corresponding face of the other body element part, the two body element parts being fused together around the constraining element to form an integral body element with the constraining element therein.

6. A drive belt comprising a length of drive belting as claimed in claim 1, the ends of said body element being joined together in abutting relation, and the ends of said constraining element also being joined together, so that an endless belt is provided with the constraining element resisting extension of the endless belt.

7. An endless drive belt comprising an elongate polyurethane body element and an elongate constraining element of woven tape, the warp threads of said woven tape being of rayon and extending longitudinally of the body element, the weft threads of said woven tape being of nylon and extending transversely of the body element, the polyurethane being extruded around the woven tape so as to totally envelope the tape and penetrating into the interstices between the warp and weft threads thus keying the body element and constraining element together, the two ends of the constraining element being cemented together in a lap joint within the body element, and the two ends of the body element being fused together in a butt joint extending around the lap joint of the constraining element.

* * * * *